United States Patent
Goebel et al.

(12)

(10) Patent No.: US 6,350,809 B1
(45) Date of Patent: Feb. 26, 2002

(54) WATER-BORNE BASE COATS AND PROCESS FOR PREPARING WATER-BORNE BASE COAT/CLEAR COAT-TWO-LAYER COATINGS

(75) Inventors: Armin Goebel, Wetter; Holger Schmidt, Wuppertal; Manfred Stein, Huerth; Bettina Vogt-Birnbrich, Solingen, all of (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/631,196

(22) Filed: Aug. 3, 2000

(51) Int. Cl.$^7$ .............................................. C08L 61/04
(52) U.S. Cl. ...................................................... 524/509
(58) Field of Search ........................................... 524/509

(56) References Cited

U.S. PATENT DOCUMENTS 5,472,634 A * 12/1995 Hart ........................... 252/193
5,597,861 A * 1/1997 Nakae ......................... 524/601

* cited by examiner

*Primary Examiner*—Paul R. Michl
(74) *Attorney, Agent, or Firm*—Sudhir G. Deshmukh

(57) ABSTRACT

Water-borne base coats, the resin solid of which contain 40 to 90 wt-% of a water-dilutable polyester binder, 0 to 50 wt-% of one or more additional binders, 0 to 20 wt-% of one or more paste resins and 10 to 40 wt-% of one or more cross-linking agents, wherein the water-dilutable polyester binder has a weight average molecular mass of 5000 to 50000, an acid value of 10 to 50 mg KOH/g, a hydroxyl value of 30 to 100 mg KOH/g and an average hydroxyl-functionality of 2 to 3 and consists of 5 to 25 wt-% of structural units —O—R—O— derived from one or more macrodiols having a hydroxyl value of 25 to 120 mg KOH/g, wherein R represents residues located between the terminal hydroxyl groups of the one or more macrodiols, are suitable for preparing water-borne base coat/clear coat-two-layer coatings, in particular water-borne base coat/powder clear coat two-layer coatings.

9 Claims, No Drawings

WATER-BORNE BASE COATS AND PROCESS FOR PREPARING WATER-BORNE BASE COAT/CLEAR COAT-TWO-LAYER COATINGS

FIELD OF THE INVENTION

The present invention relates to water-borne base coats which are suitable for preparing water-borne base coat/clear coat-two-layer coatings. The invention also relates to the use of water-borne base coats in processes for preparing water-borne base coat/clear coat-two-layer coatings.

BACKGROUND OF THE INVENTION

Top coatings in the automotive sector are currently almost universally applied as two-layer coatings of a color- and/or effect-imparting base coat layer and a transparent clear coat layer. In order to rationalise procedures there is a desire to apply such two-layer coatings essentially only onto outer surfaces (surfaces of a motor vehicle which are directly visible to the observer) and to apply onto inner surfaces (visible surfaces in the vehicle body interior, for example in the motor space, the passenger space or the trunk) solely base coat, i.e. to dispense with the clear coat layer in areas where less importance is given to optical appearance. The base coat layers not protected by a clear coat have to be tack-free (non-tacky) after stoving, first in order not to hinder the subsequent assembly steps and secondly in consideration of the practical value of the vehicle for the customer.

Due to environmental issues, water-borne base coats are preferably used for the preparation of color- and/or effect-imparting base coat/clear coat-two-layer coatings. It is thereby particularly environmentally acceptable to apply clear coat layers of powder clear coat.

In the preparation of water-borne base coat/powder clear coat-two-layer coatings an undesirable stoving-yellowing of the powder clear coat layer often occurs. By stoving-yellowing is meant an undesirable deviation in color tone of the stoved two-layer coating from the desired value and it is particularly noticeable if a base coat layer of a water-borne base coat of a light color shade is applied. The problem of stoving-yellowing of the powder clear coat is naturally enhanced due to the fact that the layer thickness of the powder clear coat layers is normally high.

An object of the invention is to provide water-borne base coats capable of being widely used for the preparation of water-borne base coat/clear coat-two-layer coatings. They should in particular be suitable for the preparation of water-borne base coat/powder clear coat-two-layer coatings which are desirably little prone to a stoving-yellowing of the powder clear coat layer. The base coat layers applied from water-borne base coats which are not coated over with clear coats, should be tack-free after stoving.

SUMMARY OF THE INVENTION

Experiments of the applicant have resulted in the object being achieved by suitably choosing the resin solid composition of the water-borne base coats.

The invention consists of providing water-borne base coats, the resin solid of which contains 40 to 90 wt-% of a water-dilutable polyester binder, 0 to 50 wt-% of one or more additional binders, 0 to 20 wt-% of one or more paste resins and 10 to 40 wt-% of one or more cross-linking agents, wherein the water-dilutable polyester binder has a weight average molecular mass of 5000 to 50000, an acid value of 10 to 50 mg KOH/g, a hydroxyl value of 30 to 100 mg KOH/g and an average hydroxyl-functionality of 2 to 3 and consists of 5 to 25 wt-% of structural units—O—R—O— derived from one or more macrodiols having a hydroxyl value of 25 to 120 mg KOH/g, wherein R represents residues located between the terminal hydroxyl groups of the one or more macrodiols.

DETAILED DESCRIPTION OF THE EMBODIMENTS

The resin solid of the water-borne base coats according to the invention contains 40 to 90 wt-%, preferably 50 to 80 wt-% of a water-dilutable polyester binder as precedingly defined. By "water-dilutable" we mean that the polyester binder is soluble in water or is dispersable in water after neutralization. The polyester can be prepared by conventional melt condensation of at least one polycarboxylic acid (or anhydride) and at least one polyol as well as at least one, preferably only one, macrodiol at temperatures of 160 to 240° C. These are processes which are conventionally used for preparing water-dilutable polyesters known to the person skilled in the art.

The polycarboxylic acids suitable for being used in the synthesis of the polyester are polycarboxylic acids having 4 to 36 carbon atoms. Examples are dimeric fatty acids as well as polycarboxylic acids, having a molecular weight ranging from 116 to 230, for example maleic acid, phthalic acid, isophthalic acid, trimellitic acid, dodecane dicarboxylic acid, tetrahydrophthalic acid, hexahydrophthalic acid, cyclohexane-1,2- and -1,4-dicarboxylic acid, sebacic acid, adipic acid. Where they exist, the corresponding acid anhydrides may also be used.

The polyols suitable for being used in the synthesis of the polyester are polyols with 2 to 36 carbon atoms. Examples are dimeric fatty alcohols as well as (cyclo)aliphatic polyols, which have a molecular weight ranging from 60 to 204, for example ethylene glycol, butanediol, hexanediol, decanediol, neopentylglycol, trimethylolpropane, trimethylolethane, glycerin, pentaerythrite, cyclohexanediol, cyclohexanedimethanol.

The macrodiols suitable for use in the synthesis of the polyester have the formula HO—R—OH, wherein R represents residues located between the terminal hydroxyl groups of the one or more macrodiols. The macrodiols have a hydroxyl value of 25 to 120, preferably of 45 to 120 mg KOH/g. Examples are the corresponding telechelic poly (meth)acrylate diols; polyurethane diols; polyester diols; polycarbonate diols; polyether diols, which can for example also be derived from epoxy resins; polybutadiene diols, which may be non-hydrogenated, partially or completely hydrogenated; alpha-omega-hydroxymethylpolysiloxanes. Polytetrahydrofurane diols are preferably used as the macrodiols in the synthesis of the polyester.

Polycarboxylic acids, polyols and macrodiol(s) are used in the preparation of the water-dilutable polyester in quantity proportions, such that a polyester with a weight average molecular mass of 5000 to 50000, preferably 10000 to 30000, an acid value of 10 to 50, preferably 20 to 30 mg KOH/g, a hydroxyl value of 30 to 100, preferably 40 to 90 mg KOH/g, and an average hydroxyl-functionality of 2 to 3, preferably 2.3 to 2.8 is obtained, wherein the polyester consists of 5 to 25, preferably 8 to 20 wt-% of structural units—O—R—O—derived from one or more macrodiols having a hydroxyl value of 25 to 120 mg KOH/g.

The polyester can be used as an organic solution or as an aqueous dispersion for the preparation of the water-borne base coats according to the invention. For example, the polyester can be dissolved in an organic solvent or in a mixture of organic solvents after the synthesis has been completed, and be converted into the aqueous phase after full or partial neutralisation with a base. A polyester solution at 50 to 80 wt-% can for example be prepared and be converted into an aqueous polyester dispersion by addition of a base and water.

Examples of suitable solvents are those which are at least partially water-miscible, such as mono- or polyhydric alcohols, for example propanol, butanol, hexanol; glycol ethers, for example diethylene glycol dialkyl ether, dipropylene glycol dialkyl ether, each having alkyl residues comprising one to six carbon atoms, ethoxypropanol, butyl glycol; N-alkylpyrrolidones, such as, for example N-methylpyrrolidone. These may be the same solvents used in the water-borne basecoats. Examples of suitable bases for neutralizing the polyester are ammonia, organic amines such as triethylamine, N-methylmorpholine or aminoalcohols such as dimethylisopropanolamine, dimethylethanolamine and 2-amino-2-methylpropanol-1. Before and/or after the addition of water, the organic solvent can be removed until the desired content is reached, for example by distilling off under reduced pressure. The aqueous polyester dispersions have a solid content of for example 35 to 65 wt-%.

Apart from the water-dilutable polyester, the resin solid of the water-borne base coats can contain 0 to 50 wt-% of one or more additional binders, in particular water-dilutable binders. The resin solid of the water-borne base coats preferably contains 10 to 35 wt-% of additional binders. Examples of additional water-dilutable binders are film-forming polymers, such as water-soluble or water-dilutable (meth)acrylic copolymer resins, polyurethane resins, (meth) acrylated polyester resins and/or (meth)acrylated polyurethane resins conventionally used in the preparation of water-borne base coats. The (meth)acrylated polyester resins or (meth)acrylated polyurethane resins are binders in which (meth)acrylic copolymer and polyester resin or (meth) acrylic copolymer and polyurethane resin are linked together by covalent bonding and/or in the form of interpenetrating resin molecules. These additional binders are known to those skilled in the art and are conventionally used in water-borne coatings.

Apart from the water-dilutable polyester, the resin solid of the water-borne base coats can contain 0 to 20 wt-% of one or more paste resins. Paste resins are used to grind pigments and may therefore be introduced into the water-borne base coats in the form of pigment pastes.

The resin solid of the water-borne base coats contains 10 to 40 wt-%, preferably 15 to 30 wt-% of one or more cross-linking agents. Examples of cross-linking agents are amine-formaldehyde condensation resins, for example melamine resins, as well as free or blocked polyisocyanates.

The water-borne base coats may be one-component water-borne base coats or water-borne base coats prepared by mixing several separately stored components.

The water-borne base coats contain one or more inorganic and/or organic color- and/or effect-imparting pigments and optionally one or more fillers. Examples of color-imparting pigments and fillers are titanium dioxide, micronised titanium dioxide, iron oxide pigments, carbon black, silicon dioxide, barium sulfate, micronised mica, talc, kaolin, chalk, azo pigments, phthalocyanine pigments, quinacridone pigments, pyrrolopyrrole pigments and perylene pigments.

Examples of metallic effect pigments are the conventional metallic pigments known to the person skilled in the art, for example of aluminium, copper or other metals. Examples of effect-imparting pigments, in addition to the metallic pigments, are interference pigments such as, e.g., metal oxide-coated metal pigments, e.g., titanium dioxide-coated aluminium, coated mica such as, e.g., titanium dioxide-coated mica.

The effect pigments are generally provided in the form of a commercial aqueous or non-aqueous paste, to which preferably water-dilutable organic solvents and additives may be optionally added, and which is then mixed with an aqueous binder, for example the aqueous polyester dispersion. Effect pigments in powder form may be processed initially with preferably water-dilutable organic solvents and additives to a paste. Colored pigments and/or fillers may be ground, for example, in a part of the aqueous binder, for example in the aqueous polyester dispersion. Grinding may also take place in a water-dilutable paste resin. The paste may then be completed with the remaining proportion of the aqueous binder or of the aqueous paste resin to obtain the finished colored pigment paste.

Moreover, the water-borne base coats may contain coatings additives in conventional amounts for coatings, for example, from 0.1 to 5 wt. %, based on their solid content, for example, rheology-influencing agents such as fine-particle silica, inorganic layered silicates, cross-linked or non-cross-linked polymer microparticles, polymeric urea compounds, water-soluble cellulose ethers or synthetic polymers with ionic and/or groups with an associative effect; anti-settling agents; levelling agents; light protecting agents; catalysts; antifoaming agents; wetting agents; adhesion promoting agents; neutralising agents.

The proportion of organic solvents in the water-borne base coats may be, for example, from 5 to 30 wt. % based on the total weight of the base coat. These are conventional coatings solvents which may originate from the preparation of the binders or added separately. Examples of such solvents are mono- or polyhydric alcohols, e.g., propanol, butanol, hexanol; glycol ethers or esters, e.g., diethylene glycol dialkyl ether, dipropylene glycol dialkyl ether, each having alkyl residues comprising one to six carbon atoms, ethoxypropanol, butylglycol; glycols, e.g., ethylene glycol, propylene glycol, and oligomers thereof, N-alkylpyrrolidones such as, e.g., N-methylpyrrolidone and ketones such as methyl ethyl ketone, acetone, cyclohexanone; aromatic or aliphatic hydrocarbons.

For the preparation of the water-borne base coats, pigments are mixed with the polyester, for example as an aqueous polyester dispersion, and optionally with additional binders, cross-linking agents, fillers, additives conventionally used in coatings and solvents.

The water-borne base coats have solid contents of 10 to 40 wt-%, for effect water-borne base coats the solid content is preferably 15 to 30 wt-%, for single-colored water-borne base coats the solid content is preferably higher, i.e., 20 to 40 wt-%.

The weight ratio of pigment to binder in the water-borne base coat is between 0.05:1 to 3:1, for effect water-borne base coats it is preferably 0.1:1 to 0.6:1, for single-colored water-borne base coats it is preferably higher, i.e., 0.1:1 to 2.5:1, each based on the solid weight. When calculating the ratio of pigment to binder, the sum of the proportions by weight of color-imparting pigments, effect pigments and fillers is brought into relation with the resin solids in the water-borne base coat.

The water-borne base coats according to the invention can be used for the preparation of color- and/or effect-imparting base coat layers of water-borne base coat/clear coat-two-layer coatings, in particular in the sector of coating automotive bodies and automotive body parts. Any clear coat coating composition can thereby be used for the preparation of the clear coat layers. Suitable clear coats are generally all known clear coats, which can be thermally cured and/or cured by way of high-energy radiation, for example UV-radiation. Solvent-containing one-component or two-component clear coats, water-based one-component or two component clear coats, powder clear coats or aqueous powder clear coat dispersions can be used here.

By using water-borne base coats according to the invention in the preparation of water-borne base coat/powder clear coat-two-layer coatings the tendency of powder clear coat layers to stoving-yellowing can be influenced in a positive direction.

Conventional powder clear coats are used for the preparation of the water-borne base coat/powder clear coat-two-layer coatings, in particular such powder clear coats as are used for the preparation of outer powder clear coat layers in automotive coating. The water-borne base coats of this invention, particularly in their preferred embodiment, provide excellent adhesion to stoved powder clear coatings. This is advantageous for repair coatings carried out in a production line, wherein water-borne base coat/powder clear coat-two-layer coatings are repaired with a two-layer coating of the same water-borne base coat and a clear coat.

The powder clear coats contain combinations of solid binders and cross linking agents, known as such for the preparation of clear coat layers. "Solid" means that they are substances with a melting point or a melting range above room temperature, in particular above 30° C. For example, these are combinations of at least one hydroxy-functional binder, particularly hydroxy-functional (meth)acrylic copolymers with at least one free or blocked polyisocyanate hardener (crosslinker, curing agent) or at least one epoxy-functional binder, particularly epoxy-functional (meth) acrylic copolymers, with at least one carboxyl- and/or carboxylic anhydride-functional hardener and/or at least one tris(alkoxycarbonylarnino) triazine hardener. Powder clear coats with epoxy-functional binders, in particular epoxy-functional (meth)acrylic copolymers and carboxyl- and/or carboxylic acid anhydride-functional hardeners are particularly prone to stoving-yellowing on water-borne base coats. It is therefore in particular an object of the invention to reduce or to prevent stoving-yellowing in the preparation of water-borne base coat/powder clear coat-two-layer coatings, which are prepared by using the latter powder clear coats.

Preferred examples for the combinations of epoxy-functional (meth)acrylic copolymers with acid, more particularly carboxyl- and/or carboxylic anhydride-functional hardeners are those which contain, as binder, glycidyl(meth) acrylic copolymers with an epoxy equivalent weight from 250 to 1000 and, as hardener, one or more low molecular weight or polymer compounds with an average of two or more carboxyl functions per molecule and/or anhydrides thereof, wherein the epoxy groups of the glycidyl(meth) acrylic copolymers are present in a ratio from 1.5:1 to 1:1.5 to the free carboxyl functions and/or carboxyl functions latently bound as anhydride. The glycidyl(meth)acrylic copolymers have an epoxy equivalent weight from 250 to 1000, preferably from 300 to 600, particularly preferably from 300 to 450. The glycidyl(meth)acrylic copolymers have, for example, glass transition temperatures from 30° C. to 120° C., preferably from 30° C. to 90° C., and their number average molecular masses (Mn) are, for example, from 1000 to 10,000, preferably from 1000 to 5000.

Apart from glycidyl acrylate and/or glycidyl methacrylate corresponding to an epoxy equivalent weight from 250 to 1000, the glycidyl(meth)acrylic copolymers contain one or more comonomers, the selection of which by the skilled person is generally made from olefinically unsaturated monomers without other functional groups, according to the desired properties of the copolymer. Examples of such comonomers are monovinyl aromatic compounds such as styrene; vinyl esters of aliphatic carboxylic acids such as, e.g., vinyl acetate, vinyl versatate; vinyl ethers; (meth) acrylonitrile; (meth)acrylamide; but more particularly (cyclo)alkyl(meth)acrylates with 1 to 18 carbon atoms in the (cyclo)alkyl part.

The glycidyl(meth)acrylate copolymers may be prepared in a manner known to the skilled person by free-radical copolymerisation, particularly by solution or bulk polymerisation.

The hardeners are one or more low molecular weight or polymer compounds with an average of two or more, preferably two carboxyl functions per molecule and/or anhydrides thereof. The anhydride groups are latently bound carboxyl groups, where each anhydride group is to be counted as a carboxyl group. Examples of carboxyl-functional hardeners are solid aliphatic dicarboxylic acids and—where they exist—the intramolecular anhydrides thereof, 1,12-dodecane dicarboxylic acid being particularly preferred. Solid dicarboxylic acid polyanhydrides with weight average molecular masses (Mw) from, for example, 1000 to 5000, may also be used, for example, 1,12-dodecane dicarboxylic (poly)anhydride. Further examples of carboxyl-functional hardeners are carboxyl-functional polymers such as, e.g., polyesters, polyurethanes, (meth)acrylic copolymers, carboxyl-functional oligourethanes, carboxyl-functional oligoesters.

The quantity ratio of glycidyl(meth)acrylic copolymers and carboxylic (anhydride) hardeners in the powder clear coats is selected in such a way that a stoichiometric ratio of epoxide groups of the glycidyl(meth)acrylic copolymers to the free carboxyl functions of the hardener or those latently bound as the anhydride is from 1.5:1 to 1:1.5, preferably 1.2:1 to 1:1.2. For example, weight ratios, totalling 100 wt. %, from 60 to 90 wt. % of glycidyl(meth)acrylic copolymer to 10 to 40 wt. % of carboxyl- and optionally anhydride-functional hardener component are present.

The powder clear coats may contain conventional powder clear coat additives in conventional amounts, for example, from 0.1 to 5 wt. %, such as, for example, levelling agents, degassing agents, antioxidants, light protecting agents, adhesion promoting agents, catalysts and rheology-controlling agents.

The powder clear coats may also contain colorless pigments, e.g., micronised titanium dioxide, aluminium oxide or silica.

The preparation of the powder clear coats is carried out preferably by extruding the powder clear coat ready formulated by dry mixing of all the components required in the form of a paste-like melt, cooling the melt, coarse comminution, fine grinding followed by sieving to the desired particle fineness, for example, to average particle sizes from 20 to 90 μm, preferably from 30 to 70 μm.

The powder clear coats can also be used in the form of an aqueous powder clear coat dispersion (slurry). For this purpose they must be converted into an aqueous powder clear coat dispersion for example by dry- or wet milling.

The water-borne base coats can be applied onto various kinds of substrates by conventional methods. In the automotive industry sector, the water-borne base coat/ clear coat two-layer coatings are typically applied to metallic or plastics substrates. The substrates are frequently precoated, i.e. plastics substrates may be provided with a plastics primer and metallic substrates generally have an electrophoretically applied primer, and optionally in addition one or more additional coating layers, such as, e.g., a primer surfacer layer. Preferably the water-borne base coats are applied by spraying in a dry film thickness of for example 8 to 40 μm. The application is carried out in the wet-on-wet process, or during the subsequent overcoating with powder clear coat in the dry-on-wet process, i.e. the base coat layer is dried to the extent desired such as by flashing-off, e.g., at 20° C. to 80° C. and is then coated over with clear coat in a dry film thickness of preferably 30 to 80 μm and is dried or stoved together with the latter. For applications in the sector of vehicle repair coating the drying temperatures are for example from room temperature to 80° C., for applications in vehicle production lines the stoving temperatures are higher, for example from 120 to 160° C. The clear coat dry film thickness and the drying or stoving temperatures depend for example on the clear coat system used, in the case of powder clear coats the dry film thickness and stoving temperature are each in the higher value range.

Water-borne base coat/clear coat-two-layer coatings prepared with the water-borne base coats according to the invention correspond in their technological properties to the requirements of car manufacturers.

From the water-borne base coats according to the invention it is possible to apply coating layers which are tack-free after stoving under the stoving conditions explained above. This allows the ability to eliminate the application of the clear coat layer in certain areas such as, for example, the inner surfaces of an automobile body (e.g., the motor space, passenger space or trunk). Such surfaces would be coated with a base coat, but, because the appearance of such surfaces is not as critical as the exterior surfaces, the clear coat need not be applied.

EXAMPLES

Example 1

971 g neopentyl glycol, 956 g hexanediol-1,6 and 597 g polytetrahydrofuranediol (hydroxyl value 112 mg KOH/g) were melted and subsequently esterified with 615 g hexahydrophthalic acid anhydride and 2277 g C36-dimeric fatty acid at a maximum of 220° C. until an acid value of 8 mg KOH/g was reached. After cooling to 160° C., 1023 g trimellitic acid anhydride were added and esterification was carried out at maximum 180° C. until an acid value of 28 mg KOH/g was reached. The polyester had a hydroxyl value of 75 mg KOH/g and a weight average molecular mass of 25000. After cooling to 120° C. a dilution with 1878 g n-butanol and a conversion into a polyester dispersion at 60 wt-% was carried out by diluting with deionised water after addition of 110 g dimethylethanolamine.

Example 2

1005 g of a straight-chain polyester (composed of adipic acid, isophthalic acid and hexanediol having an OH-value of 102 mg KOH/g) were heated to 90° C. and 1.8 g trimethylolpropane and 393 g of isophorone diisocyanate were added. Conversion took place at 90° C. until an NCO-value of 3.8 was reached. After cooling to 60° C., a solution of 35.3 g of dimethylol propionic acid, 26.1 g triethylamine and 250 g N-methylpyrrolidone was added. After heating to 80° C., the reaction temperature was maintained until an NCO-value of 1.5 was reached. The batch was mixed with a molar amount of deionised water, and the solution was kept at 80° C., until no more NCO was detectable. The batch was then converted into an aqueous dispersion having a solid content of 35 wt-% by adding deionised water.

Example 3

A white paste was prepared by mixing 1250 g of the polyester dispersion of Example 1 with 480 g of an aqueous solution of dimethylethanolamine at 10 wt-%, 784 g butyl glycol and 1006 g deionised water. 5560 g titanium dioxide were added and dispersed. Thereafter additional 520 g of the polyester dispersion of Example 1 were added and dilution by mixing with 400 g deionised water took place.

Example 4

A white paste was prepared: 3030 g of the polyurethane dispersion of Example 2 were mixed with 260 g of an aqueous solution of dimethylethanolamine at 10 wt-%, 784 g butyl glycol and 366 g deionised water. 5560 g titanium dioxide were added and dispersed.

Example 5

By thoroughly mixing the following components, a white water-borne base coat (resin solid composition: 75 wt-% polyester resin, 25 wt-% melamine resin) was prepared:

1200 g deionised water, 765 g of the aqueous polyester dispersion of Example 1, 250 g hexamethoxymethyl melamine, 150 g butyl glycol, 350 g deionised water, 50 g hexyl glycol, 60 g of an aqueous solution of a polyacrylic acid thickener (Viscalex® HV 30 from Allied Colloids) at 10 wt-%, 80 g of an aqueous solution of dimethylethanolamine at 10 wt-%, 100 g N-methylpyrrolidone, 1575 g of the white paste of Example 3.

Example 6

By thoroughly mixing the following components a white water-borne coat (solid resin composition: 75 wt-% polyurethane resin, 25 wt-% melamine resin) was prepared:

653 g deionised water, 1312 g of the aqueous polyurethane dispersion of Example 2, 250 g hexamethoxymethyl melamine, 150 g butyl glycol, 350 g deionised water, 50 g hexyl glycol, 60 g of an aqueous solution of a polyacrylic acid thickener (Viscalex® HV 30) at 10 wt-%, 80 g of an aqueous solution of dimethylethanolamine at 10 wt-%, 100 g N-methylpyrrolidone, 1575 g of the white paste of Example 4.

Example 7

850 g of the white water-borne base coat of Example 5 were mixed with 150 g of the white water-borne base coat of Example 6. The resin solid composition was 63.75 wt-% polyester, 11.25 wt-% polyurethane resin, 25 wt-% melamine resin.

Example 8

500 g of the white water-borne base coat of Example 5 were mixed with 500 g of the white water-borne base coat of Example 6. The resin solid composition was 37.5 wt-% polyester, 37.5 wt-% polyurethane resin, 25 wt-% melamine resin.

Example 9

A powder clear coat was prepared: 729 g of an epoxy-functional methacryl copolymer with an epoxy equivalent weight of 380 and an average molecular weight (Mn) of 2000, 210 g 1.12-dodecandiacid, 30 g of a light protecting agent (1:1-mixture of Tinuvin® 900 (UV-absorber) and Tinuvin® 111 (sterically hindered amine light protecting agent), (both from the company Ciba), 3 g benzoin, 6g of Irganox® B 225 (antioxidant) from the company Ciba and 8 g of Troy® EX 570 (levelling agent) from the company Troy Chemie were first mixed in a dry state and then dispersed at 100 to 120° C. by means of an extruder. After cooling off and pre-comminuting of the extrudate the latter was milled in an air separation ball mill to an average particle size ($d_{50}$) of 20 μm to a powder clear coat.

The white water-borne base coats 5-8 were each first tinted to achieve color shade identity and then each sprayed in a dry film thickness of 25 μm onto conventional phosphated test panels of vehicle body steel which have been precoated with a cathodic electrodeposition primer and with primer surfacer. After the application, a short flashing-off and then a pre-drying of 10 minutes at 80° C. was carried out. Overcoating with the powder clear coat of Example 9 in a dry film thickness of 60 μm and stoving for 30 minutes at 140° C. (object temperature) was then carried out. Colorimetric evaluation of the obtained coatings resulted in the value b* (CIELab76-system).

In an analogous way to the preparation of the preceding water-borne base coat/powder clear coat-two-layer coatings the corresponding water-borne base coat/clear coat-two-layer coatings were prepared by using a commercially available two-component clear coat (acrylic binder/ polyisocyanate hardener clear coat) instead of the powder clear coat of Example 9. The clear coat layer thickness of these multi-layer coatings serving as standards with minimal clear coat stoving-yellowing was each time 35 μm. Colorimetric evaluation of the standards resulted in the value b* as in the multi-layer coatings prepared with the powder clear coat of Example 9.

The difference delta b* was created by subtraction of the value b* determined for each standard from the value b* determined for the corresponding multi-layer coating prepared with the powder clear coat. The differences delta b* serve as the measuring unit for each stoving-yellowing of the powder clear coat layer. The intensity of the stoving-yellowing varied in strength depending on the water-borne base coat used. The smaller value of delta b* thereby represents reduced stoving-yellowing:

water-borne base coat 5: delta b*=0.5,
water-borne base coat 6: delta b*=1.6,
water-borne base coat 7: delta b*=0.8,
water-borne base coat 8: delta b*=1.2.

Repair coatings were simulated on the test panels provided with the water-borne base coat/powder clear coat-two-layer coatings prepared with the water-borne base coats 5 and 7. A two-layer coating consisting of the corresponding water-borne base coat and a two-component clear coat (acrylic binder/ polyisocyanate hardener clear coat) was therefore applied onto the stoved and non-sanded powder clear coat layer. The water-borne base coat layer was pre-dried for 10 minutes at 80° C. and stoved together with the two-component clear coat layer for 30 minutes at 140° C. (object temperature).

The adhesion of the repair coatings was tested for 24 hours after condensation water strain according to DIN 50017 (240 hours at 40° C.) by cross-cutting according to DIN EN—ISO 2409 and was each time satisfactory.

What is claimed is:

1. A water-borne coating composition suitable for use as a base coat in a base coat/clear coat two-layer coating, said coating composition having a resin solid content comprising
   40 to 90% wt-%, based on the weight of the resin solid, of a water-dilutable polyester binder;
   0 to 50 wt-%, based on the weight of the resin solid, of at least one additional binder selected from the group consisting of a water-dilutable (meth)acrylic copolymer resin, polyurethane resin, (meth)acrylated polyester resin, (meth)acrylated polyurethane resin and any combinations thereof,
   0 to 20 wt-%, based on the weight of the resin solid, of at least one paste resin and
   10 to 40 wt-%, based on the weight of the resin solid, of at least one crosslinking agent selected from the group consisting of amine-formaldehyde condensation resins, free polyisocyanates, blocked polyisocyanates, and any combination thereof;
   wherein the water-dilutable polyester binder has a weight average molecular mass of 5,000 to 50,000, an acid value of 10 to 50 mg KOH/g, a hydroxyl value of 30 to 100 mg KOH/g, an average hydroxyl-functionality of 2 to 3 and consists of 5 to 25 wt-% of structural units —O—R—O— derived from at least one macrodiol having a hydroxyl value of 25 to 120 mg KOH/g,
   wherein R represents residues located between the terminal hydroxyl groups of the macrodiol and wherein the macrodiol comprises a polytetrahydrofurane diol.

2. The coating composition of claim 1, wherein the macrodiol has a hydroxyl value of 45 to 120 mg KOH/g.

3. A process for preparing a water-borne base coat/clear coat two-layer coating on a substrate which comprises
   applying a water-borne base coating composition to a substrate; wherein said coating composition has a resin solid content of:
   40 to 90 wt-%, based on the weight of the resin solid, of a water-dilutable polyester binder;
   0 to 50 wt-%, based on the weight of the resin solid, of at least one additional binder selected from the group consisting of a water-dilutable (meth)acrylic copolymer resin, polyurethane resin, (meth)acrylated polyester resin, (meth)acrylated polyurethane resin and any combinations thereof,
   0 to 20 wt-%, based on the weight of the resin solid, of at least one paste resin and
   10 to 40 wt-%, based on the weight of the resin solid, of at least one crosslinking agent selected from the group consisting of amine-formaldehyde condensation resins, free polyisocyanates, blocked polyisocyanates, and any combination thereof; and
   wherein the water-dilutable polyester binder has a weight average molecular mass of 5,000 to 50,000, an acid value of 10 to 50 mg KOH/g, a hydroxyl value of 30 to 100 mg KOH/g, an average hydroxyl-functionality of 2 to 3 and consists of 5 to 25 wt-% of structural units—O—R—O— derived from at least one macrodiol having a hydroxyl value of 25 to 120 mg KOH/g, wherein R represents residues located between the terminal hydroxyl groups of the macrodiol and wherein the macrodiol comprises a polytetrahydrofurane diol; and applying a clear coat over said base coat and curing said base coat and clear coat to form said two layer base coat/clear coat coating.

4. The process of claim 3, wherein the clear coat is selected from the group consisting of thermally curable clear coats, clear coats curable by way of high-energy radiation and clear coats which are curable thermally and by way of high-energy radiation.

5. The process of claim 4, wherein the clear coat is selected from the group consisting of solvent-containing one-component clear coats, solvent-containing two-component clear coats, water-based one-component clear coats, water-based two-component clear coats, powder clear coats and aqueous powder clear coat dispersions.

6. The process of claim 5, wherein the powder clear coat comprises at least one binder/cross-inking agent combination selected from the group consisting of:

(a) hydroxy-functional binder with free or blocked polyisocyanate hardener and (b) epoxy-functional binder with a hardener selected from the group consisting of
  (i) carboxylic acid functional hardener;
  (ii) carboxylic acid anhydride functional hardener;
  (iii) tris(alkoxycarbonylamino)triazine hardener; and
  (iv) combinations thereof.

7. The process of claim 3, wherein the substrate is selected from the group consisting of metal and plastic.

8. The process of claim 3, wherein the substrate is selected from the group consisting of automotive bodies and automotive body parts.

9. A substrate having on at least one major surface thereof a water-borne coating composition;

wherein said coating composition having a resin solid content comprising 40 to 90% wt-%, based on the weight of the resin solid, of a water-dilutable polyester binder;

0 to 50 wt-%, based on the weight of the resin solid, of at least one additional binder selected from the group consisting of a water-dilutable (meth)acrylic copolymer resin, polyurethane resin, (meth)acrylated polyester resin, (meth)acrylated polyurethane resin and any combinations thereof, 0 to 20 wt-%, based on the weight of the resin solid, of at least one paste resin and 10 to 40 wt-%, based on the weight of the resin solid, of at least one crosslinking agent selected from the group consisting of amine-formaldehyde condensation resins, free polyisocyanates, blocked polyisocyanates, and any combination thereof; and wherein the water-dilutable polyester binder has a weight average molecular mass of 5,000 to 50,000, an acid value of 10 to 50 mg KOH/g, a hydroxyl value of 30 to 100 mg KOH/g, an average hydroxyl-functionality of 2 to 3 and consists of 5 to 25 wt-% of structural units—O—R— derived from at least one macrodiol having a hydroxyl value of 25 to 120 mg KOH/g, wherein R represents residues located between the terminal hydroxyl groups of the macrodiol and wherein the macrodiol comprises a polytetrahydrofurane diol.

* * * * *

UNITED STATES PATENT AND TRADEMARK OFFICE
CERTIFICATE OF CORRECTION

PATENT NO.    : 6,350,809 B1
DATED         : February 26, 2002
INVENTOR(S)   : Armin Goebel, Holger Schmidt, Manfred Stein and Bettina Vogt-Birnbrich It is certified that error appears in the above-identified patent and that said Letters Patent is hereby corrected as shown below:

Column 10,
Line 18, replace "90 %" with -- 90 wt-% --.

Column 11,
Line 24, replace "cross-inking" with -- cross-linking --.

Column 12,
Line 29, replace "O-R- derived" with -- O-R-O- derived --.

Signed and Sealed this

Tenth Day of September, 2002

Attest:

JAMES E. ROGAN
Attesting Officer          Director of the United States Patent and Trademark Office